(12) United States Patent
Xu

(10) Patent No.: US 9,975,169 B2
(45) Date of Patent: May 22, 2018

(54) ADDITIVE MANUFACTURED FUEL NOZZLE CORE FOR A GAS TURBINE ENGINE

(71) Applicant: United Technologies Corporation, Farmington, CT (US)

(72) Inventor: JinQuan Xu, Groton, CT (US)

(73) Assignee: United Technologies Corporation, Farmington, CT (US)

( * ) Notice: Subject to any disclaimer, the term of this patent is extended or adjusted under 35 U.S.C. 154(b) by 74 days.

(21) Appl. No.: 15/026,409

(22) PCT Filed: Oct. 1, 2014

(86) PCT No.: PCT/US2014/058617
§ 371 (c)(1),
(2) Date: Mar. 31, 2016

(87) PCT Pub. No.: WO2015/050987
PCT Pub. Date: Apr. 9, 2015

(65) Prior Publication Data
US 2016/0236271 A1      Aug. 18, 2016

Related U.S. Application Data

(60) Provisional application No. 61/886,980, filed on Oct. 4, 2013.

(51) Int. Cl.
*B22C 9/10* (2006.01)
*B22D 17/20* (2006.01)
(Continued)

(52) U.S. Cl.
CPC .............. *B22C 9/10* (2013.01); *B22C 9/103* (2013.01); *B22C 9/24* (2013.01); *B22D 17/20* (2013.01);
(Continued)

(58) Field of Classification Search
CPC .............. B22C 9/10; B22C 9/103; B22C 9/24
See application file for complete search history.

(56) References Cited

U.S. PATENT DOCUMENTS

| 5,900,207 A | 5/1999 | Danforth et al. |
| 5,988,531 A | 11/1999 | Maden et al. |
| (Continued) | | |

FOREIGN PATENT DOCUMENTS

| EP | 1384565 | 1/2004 |
| JP | 200875149 | 4/2008 |
| (Continued) | | |

OTHER PUBLICATIONS

Simchi, "The Role of Particle Size on the Laser Sintering of Iron Powder," Metallurgical and Materials Transactions B, v. 35B, Oct. 2004, pp. 937-949.

(Continued)

*Primary Examiner* — James Sanders
(74) *Attorney, Agent, or Firm* — O'Shea Getz P.C.

(57) ABSTRACT

A method of manufacturing a fuel component for a gas turbine engine combustor includes additive manufacturing a sacrificial core and manufacturing a fuel component body at least partially around the sacrificial core. The sacrificial core is at least partially removed to at least partially define an internal geometry of the fuel component. An additively manufactured sacrificial core for a fuel component of a gas turbine engine combustor includes a first structure and a second structure. The first structure at least partially defines a first passage of the fuel component. The second structure at least partially defines a second passage of the fuel component. The second structure at least partially surrounds the first structure.

8 Claims, 8 Drawing Sheets

(51) Int. Cl.
*F23R 3/28* (2006.01)
*F23D 11/38* (2006.01)
*B22C 9/24* (2006.01)
*F02C 7/236* (2006.01)

(52) U.S. Cl.
CPC ............ *F02C 7/2365* (2013.01); *F23D 11/38* (2013.01); *F23R 3/28* (2013.01); *F23R 3/286* (2013.01); *F05D 2230/211* (2013.01); *F05D 2230/30* (2013.01)

(56) References Cited

U.S. PATENT DOCUMENTS

| | | | |
|---|---|---|---|
| 6,136,948 | A | 10/2000 | Dickens, Jr. et al. |
| 6,401,859 | B1 | 6/2002 | Widmer et al. |
| 6,409,902 | B1 | 6/2002 | Yang et al. |
| 6,487,860 | B2 | 12/2002 | Mayersky et al. |
| 6,533,062 | B1 | 3/2003 | Widmer et al. |
| 6,898,938 | B2 | 5/2005 | Mancini et al. |
| 8,124,245 | B2 | 2/2012 | Budinger et al. |
| 8,171,734 | B2 | 5/2012 | McMasters et al. |
| 8,210,211 | B2 | 7/2012 | McMasters et al. |
| 2003/0121266 | A1 | 7/2003 | Modi et al. |
| 2005/0006047 | A1 | 1/2005 | Wang et al. |
| 2005/0126004 | A1 | 6/2005 | Smith et al. |
| 2006/0130328 | A1 | 6/2006 | Prociw et al. |
| 2007/0017224 | A1 | 1/2007 | Li et al. |
| 2007/0028595 | A1 | 2/2007 | Mongia et al. |
| 2007/0028617 | A1 | 2/2007 | Hsieh et al. |
| 2007/0028618 | A1 | 2/2007 | Hsiao et al. |
| 2007/0028620 | A1 | 2/2007 | McMasters et al. |
| 2007/0028624 | A1 | 2/2007 | Hsieh et al. |
| 2007/0071902 | A1 | 3/2007 | Dietrich et al. |
| 2007/0084047 | A1 | 4/2007 | Lange et al. |
| 2007/0098929 | A1 | 5/2007 | Dietrich et al. |
| 2007/0119177 | A1 | 5/2007 | McMasters et al. |
| 2007/0141375 | A1 | 6/2007 | Budinger et al. |
| 2007/0163114 | A1 | 7/2007 | Johnson |
| 2007/0278794 | A1 | 12/2007 | Huskamp et al. |
| 2009/0014101 | A1 | 1/2009 | McMasters et al. |
| 2009/0014561 | A1 | 1/2009 | McMasters et al. |
| 2009/0255262 | A1 | 10/2009 | McMasters et al. |
| 2010/0025001 | A1 | 2/2010 | Lee et al. |
| 2012/0228397 | A1 | 9/2012 | Thomson |
| 2013/0026338 | A1 | 1/2013 | Castle et al. |

FOREIGN PATENT DOCUMENTS

| | | |
|---|---|---|
| WO | 9900234 | 1/1999 |
| WO | 2007110010 | 10/2007 |

OTHER PUBLICATIONS

Crocker et al., "Fuel Nozzle Aerodynamic Design Using CFD Analysis", Journal of Engineering to gas Turbines and Power, Jul. 1997, vol. 119, pp. 527-534.

Extended EP Search Report dated Jul. 7, 2016.

ADDITIVE MANUFACTURED FUEL NOZZLE CORE FOR A GAS TURBINE ENGINE

CROSS-REFERENCE TO RELATED APPLICATION

This application claims priority to PCT Patent Application No. PCT/US14/58617 filed Oct. 1, 2014, which claims priority to U.S. Patent Appln. Ser. No. 61/886,980 filed Oct. 4, 2013, which are hereby incorporated herein by reference in their entireties.

BACKGROUND

The present disclosure relates to a fuel nozzle assembly for a gas turbine engine and, more particularly, to the manufacture thereof.

Gas turbine engines typically include a compressor section to pressurize airflow, a combustor section to burn a hydrocarbon fuel in the presence of the pressurized air, and a turbine section to extract energy from the resultant combustion gases.

The combustor section includes a multiple of circumferentially distributed fuel nozzles and swirlers in communication with a combustion chamber to supply fuel to mix with the pressurized airflow. Although effective, the fuel nozzles and swirlers are relatively complicated to manufacture.

SUMMARY

A method of manufacturing a fuel component for a gas turbine engine combustor, according to one disclosed non-limiting embodiment of the present disclosure, includes additive manufacturing a sacrificial core; manufacturing a fuel component body at least partially around the sacrificial core; and at least partially removing the sacrificial core to at least partially define an internal geometry of the fuel component.

In a further embodiment of the present disclosure, the method includes additive manufacturing the sacrificial core of a refractory metal alloy.

In a further embodiment of any of the foregoing embodiments of the present disclosure, the method includes additive manufacturing the sacrificial core of a ceramic material.

In a further embodiment of any of the foregoing embodiments of the present disclosure, the method includes additive manufacturing the sacrificial core of a hybrid material.

In a further embodiment of any of the foregoing embodiments of the present disclosure, the method includes additive manufacturing an interface structure that at least partially surrounds the sacrificial core.

In a further embodiment of any of the foregoing embodiments of the present disclosure, the method includes additive manufacturing an interface structure of the sacrificial core that is outside the internal geometry of the fuel component body during the manufacturing of the fuel component body.

In a further embodiment of any of the foregoing embodiments of the present disclosure, the method includes additive manufacturing a connection of the sacrificial core that is inside the internal geometry of the fuel component body during the manufacturing of the fuel component body.

In a further embodiment of any of the foregoing embodiments of the present disclosure, the method includes additive manufacturing a first structure and a second structure. The first structure at least partially defines a first passage of the internal geometry. The second structure at least partially defines a second passage of the internal geometry.

In a further embodiment of any of the foregoing embodiments of the present disclosure, the method includes additive manufacturing an interface structure between the first structure and the second structure that is outside the internal geometry of the fuel component body during the manufacturing of the fuel component body.

In a further embodiment of any of the foregoing embodiments of the present disclosure, the method includes additive manufacturing a connection between the first structure and the second structure that is within the internal geometry of the fuel component body during the manufacturing of the fuel component body.

An additively manufactured sacrificial core for a fuel component of a gas turbine engine combustor, according to another disclosed non-limiting embodiment of the present disclosure, includes a first structure that at least partially defines a first passage of the fuel component; and a second structure that at least partially defines a second passage of the fuel component. The second structure at least partially surrounds the first structure.

In a further embodiment of any of the foregoing embodiments of the present disclosure, the sacrificial core is manufactured of a refractory metal alloy.

In a further embodiment of any of the foregoing embodiments of the present disclosure, the sacrificial core is manufactured of a ceramic material.

In a further embodiment of any of the foregoing embodiments of the present disclosure, the sacrificial core is manufactured of a hybrid material.

In a further embodiment of any of the foregoing embodiments of the present disclosure, the fuel component is a fuel nozzle.

In a further embodiment of any of the foregoing embodiments of the present disclosure, the first structure is defined at least partially along a central axis. The second structure defined at least partially around the first structure.

In a further embodiment of any of the foregoing embodiments of the present disclosure, the second structure at least partially defines a helical member.

In a further embodiment of any of the foregoing embodiments of the present disclosure, a third structure is included and defined at least partially around the second structure.

In a further embodiment of any of the foregoing embodiments of the present disclosure, a fourth structure is included and defined at least partially around the third structure. The fourth structure defines an inner surface of a strut of the fuel nozzle.

In a further embodiment of any of the foregoing embodiments of the present disclosure, an interface structure is included between the first structure and the second structure. The interface structure is located outside the first passage and the second passage of the fuel nozzle.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
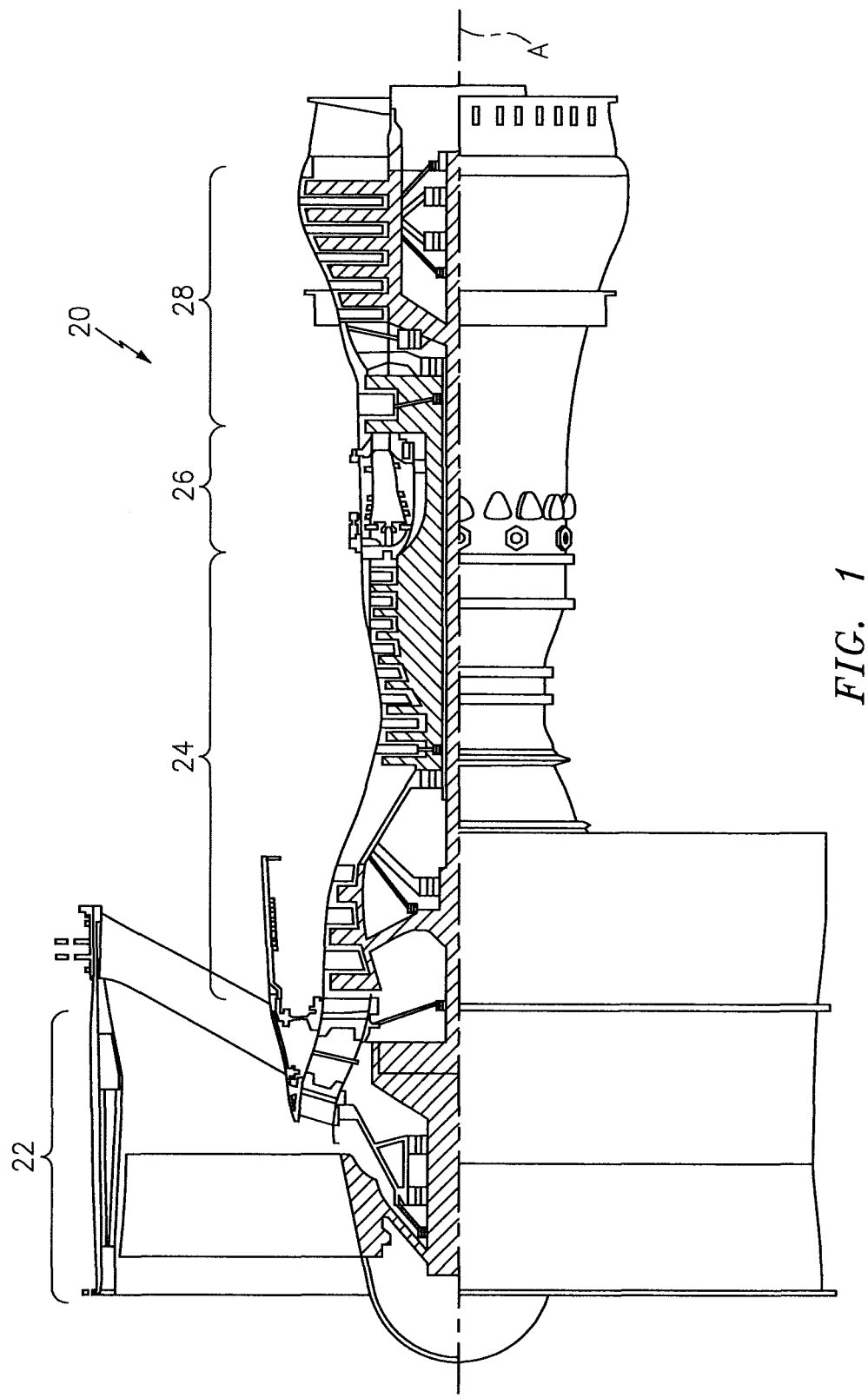
FIG. 1 is a schematic cross-section of an example gas turbine engine architecture.

FIG. 1 schematically illustrates a gas turbine engine 20. The gas turbine engine 20 is disclosed herein as a two-spool turbo fan that generally includes a fan section 22, a compressor section 24, a combustor section 26 and a turbine section 28. The fan section 22 drives air along a bypass flowpath and into the compressor section 24. The compressor section 24 drives air along a core flowpath for compression and communication into the combustor section 26, which then expands and directs the air through the turbine section 28. Although depicted as a turbofan in the disclosed non-limiting embodiment, it should be understood that the concepts described herein are not limited to use with turbofans as the teachings may be applied to other types of turbine engines such as a low bypass augmented turbofan, turbojets, turboshafts, and three-spool (plus fan) turbofans with an intermediate spool. Still other engine architectures are located within an enclosure typical of an industrial gas turbine (IGT).

Figure 2:
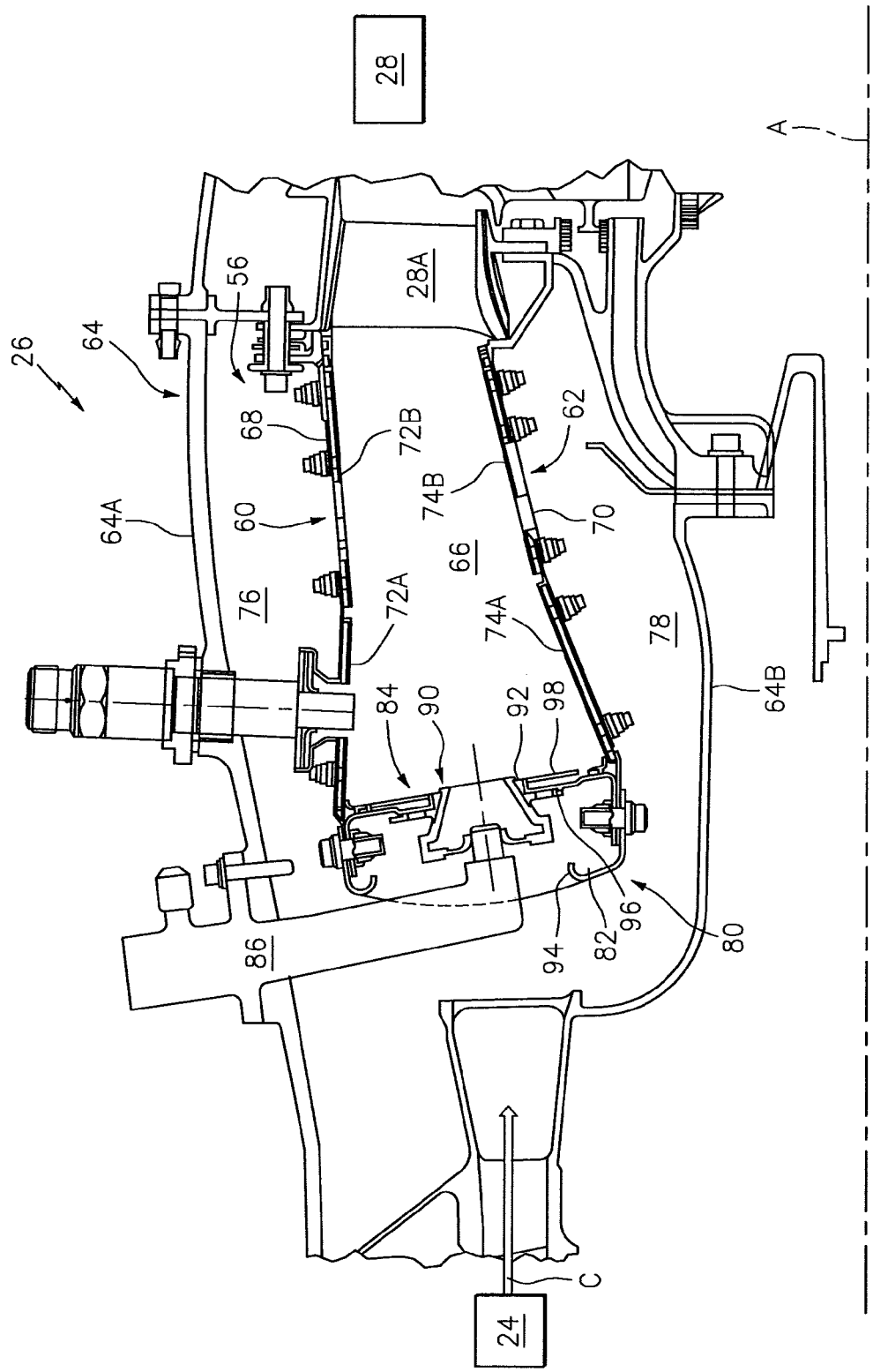
FIG. 2 is an expanded longitudinal schematic sectional view of an example combustor section.

With reference to FIG. 2, the combustor section 26 generally includes a combustor 56 with an outer combustor wall assembly 60, an inner combustor wall assembly 62 and a diffuser case module 64. The outer combustor wall assembly 60 and the inner combustor wall assembly 62 are spaced apart such that a combustion chamber 66 is defined therebetween. The combustion chamber 66 may be generally annular in shape.

The outer combustor liner assembly 60 is spaced radially inward from an outer diffuser case 64A of the diffuser case module 64 to define an outer annular plenum 76. The inner combustor liner assembly 62 is spaced radially outward from an inner diffuser case 64B of the diffuser case module 64 to define an inner annular plenum 78. It should be understood that although a particular combustor is illustrated, other combustor types to include but not be limited to a can combustor architecture as well as various combustor liner arrangements will also benefit herefrom.

The combustor wall assemblies 60, 62 contain the combustion products for direction toward the turbine section 28. Each combustor wall assembly 60, 62 generally includes a respective support shell 68, 70 which supports one or more liner panels 72, 74. Each of the liner panels 72, 74 may be generally rectilinear and manufactured of, for example, a nickel based super alloy, ceramic or other high temperature resistant material and are arranged to form a liner array. In one disclosed non-limiting embodiment, the liner array includes a multiple of forward liner panels 72A and a multiple of aft liner panels 72B that are circumferentially staggered to line the outer shell 68. A multiple of forward liner panels 74A and a multiple of aft liner panels 74B are circumferentially staggered to line the inner shell 70.

The combustor 56 further includes a forward assembly 80 immediately downstream of the compressor section 24 to receive compressed airflow therefrom. The forward assembly 80 generally includes an annular hood 82 and a bulkhead assembly 84 which locate a multiple of fuel components such as fuel injectors 86 (one shown) and a multiple of swirlers 90 (one shown). Each of the swirlers 90 is mounted within an opening 92 of the bulkhead assembly 84 to be circumferentially aligned with one of a multiple of annular hood ports 94. Each bulkhead assembly 84 generally includes a bulkhead support shell 96 secured to the combustor wall assembly 60, 62, and a multiple of circumferentially distributed bulkhead liner panels 98 secured to the bulkhead support shell 96.

The annular hood 82 extends radially between, and is secured to, the forwardmost ends of the combustor wall assemblies 60, 62. The annular hood 82 forms the multiple of circumferentially distributed hood ports 94 that accommodate the respective fuel injector 86 and introduce air into the forward end of the combustion chamber 66. Each fuel injector 86 may be secured to the diffuser case module 64 and project through one of the hood ports 94 and the respective swirler 90.

The forward assembly 80 introduces core combustion air into the forward section of the combustion chamber 66 while the remainder enters the outer annular plenum 76 and the inner annular plenum 78. The multiple of fuel injectors 86 and adjacent structure generate a blended fuel-air mixture that supports stable combustion in the combustion chamber 66.

Opposite the forward assembly 80, the outer and inner support shells 68, 70 are mounted to a first row of Nozzle Guide Vanes (NGVs) 28A. The NGVs 28A are static engine components which direct the combustion gases onto the turbine blades in the turbine section 28 to facilitate the conversion of pressure energy into kinetic energy. The combustion gases are also accelerated by the NGVs 28A because of their convergent shape and are typically given a "spin" or a "swirl" in the direction of turbine rotation.

Figure 3:
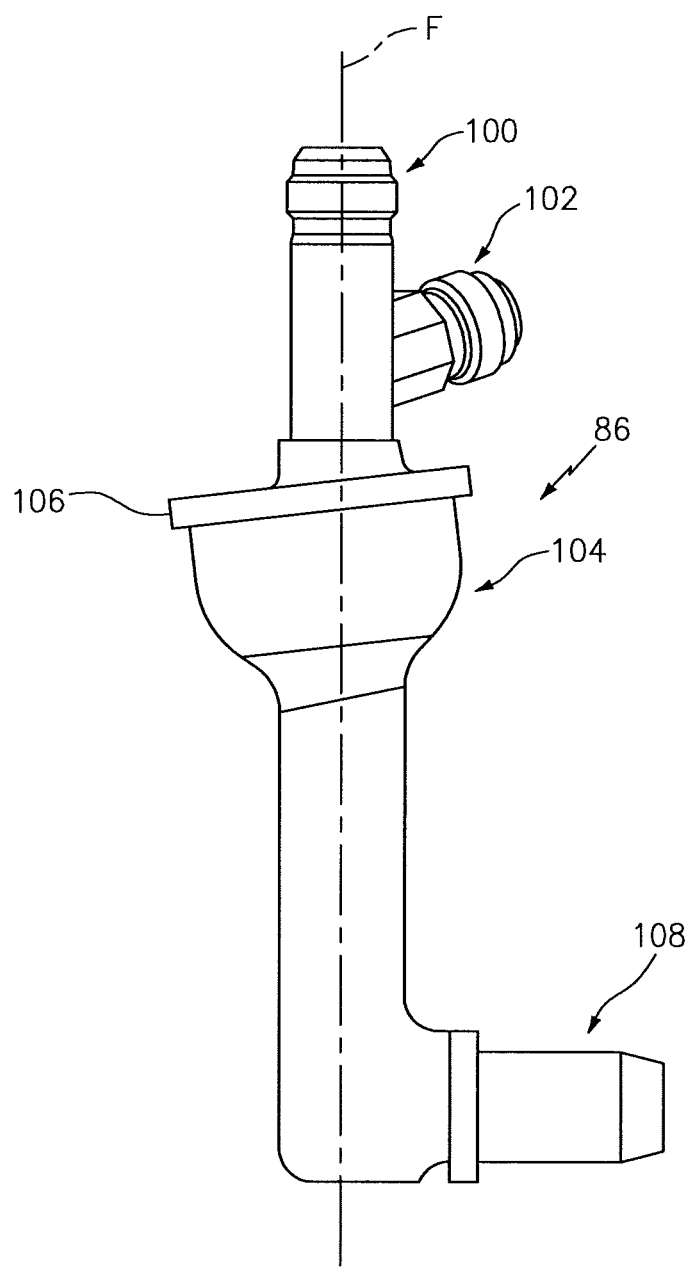
FIG. 3 is an isometric view of a fuel injector.

With reference to FIG. 3, each of the multiple of fuel injectors 86—illustrated in FIG. 3 as a duplex fuel nozzle—may include a first inlet 100, a second inlet 102, a support 104, a mount flange 106 and a nozzle tip 108. In another disclosed non-limiting embodiment, the first inlet 100 may receive a first fluid as a liquid, such as Jet-A, diesel, JP8, water and combinations thereof and the second inlet 102 may receive a second fluid as a gas such as a natural gas.

Figure 4:
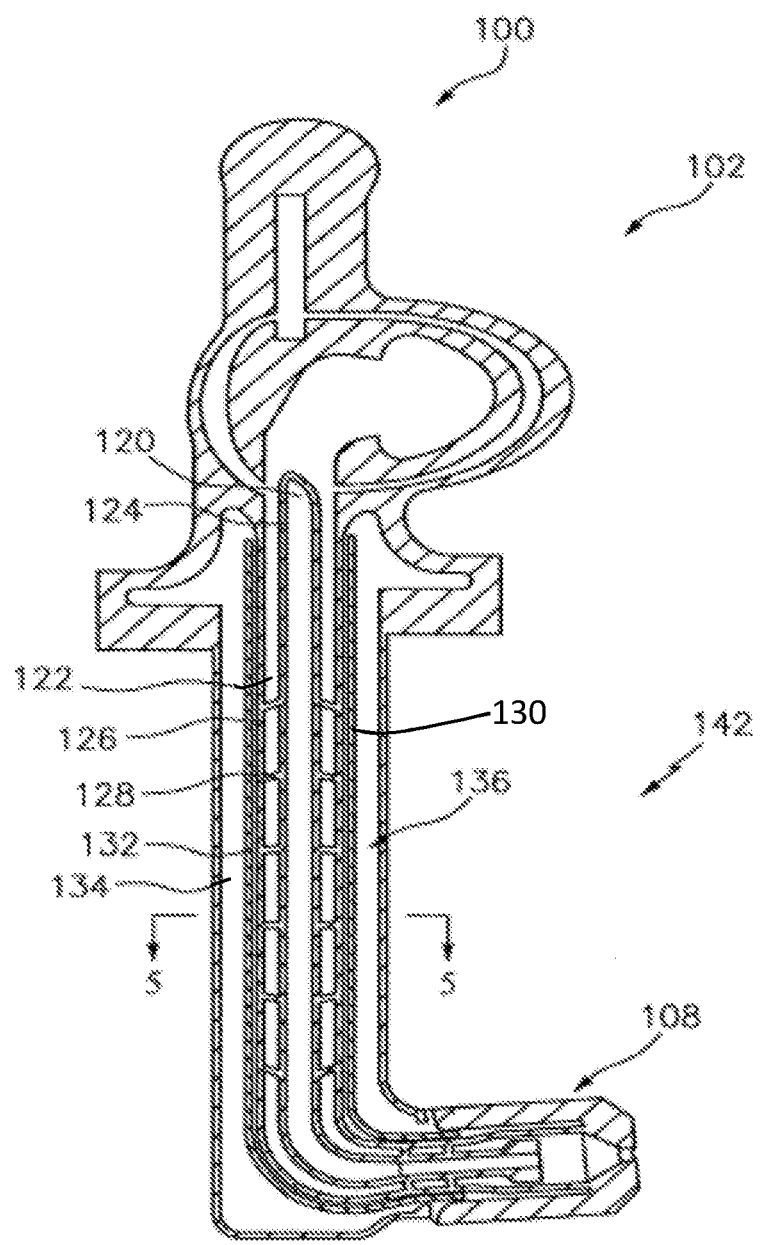
FIG. 4 is a sectional view of the fuel injector of FIG. 3.

With reference to FIG. 4, the first inlet 100 communicates with the nozzle tip 108 through a first passage 120 and the second inlet 102 communicates with the nozzle tip 108 through a second passage 122. In one disclosed non-limiting embodiment, a tube 124 (also shown in FIG. 5) along a central axis F of the fuel injector 86 defines the first passage 120 while the second passage 122 is defined by a first wall 126 (also shown in FIG. 5) around the tube 124 and within the support 104. In this disclosed non-limiting embodiment, a helical member 128 is located within the second passage 122. A second wall 130 further defines an inner volume 132 around the first wall 126 and an outer volume 134 between the second wall 130 and the support 104. The second wall 130, for example, operates as a heat shield between the passages 120, 122 and the support 104. It should be appreciated that various structures, passage and volumes will alternately benefit herefrom.

The passages 120, 122 and volumes 132, 134 define, as illustrated in this disclosed non-limiting embodiment, an internal geometry 136 of the fuel injector 86. As defined herein, passages 120, 122 communicate between the respective inlets 100, 102 and the tip nozzle 108, while volumes 132, 134 may be sealed from one or both. The passages 120, 122 and volumes 132, 134 may be connected by and/or contain various transverse structure 138 (see also FIG. 5) at one or more longitudinal positions to provide relative structural support, e.g., struts and/or flow control, e.g., helical member 128.

Figure 5:
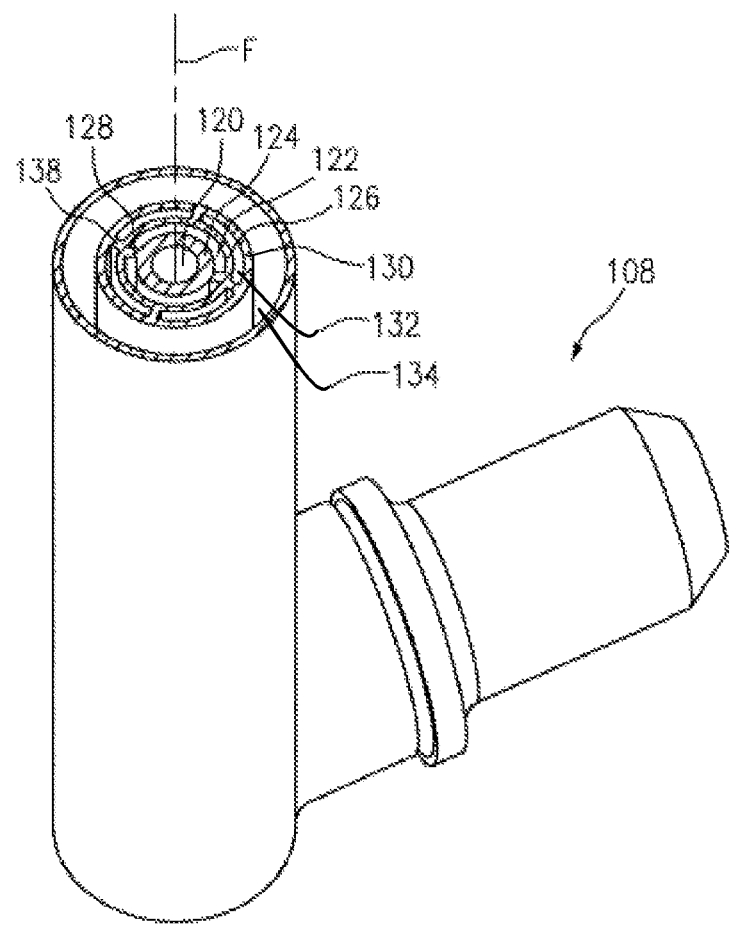
FIG. 5 is an expanded lateral sectional view of a fuel nozzle along line 5-5 in FIG. 4.
Figure 6:
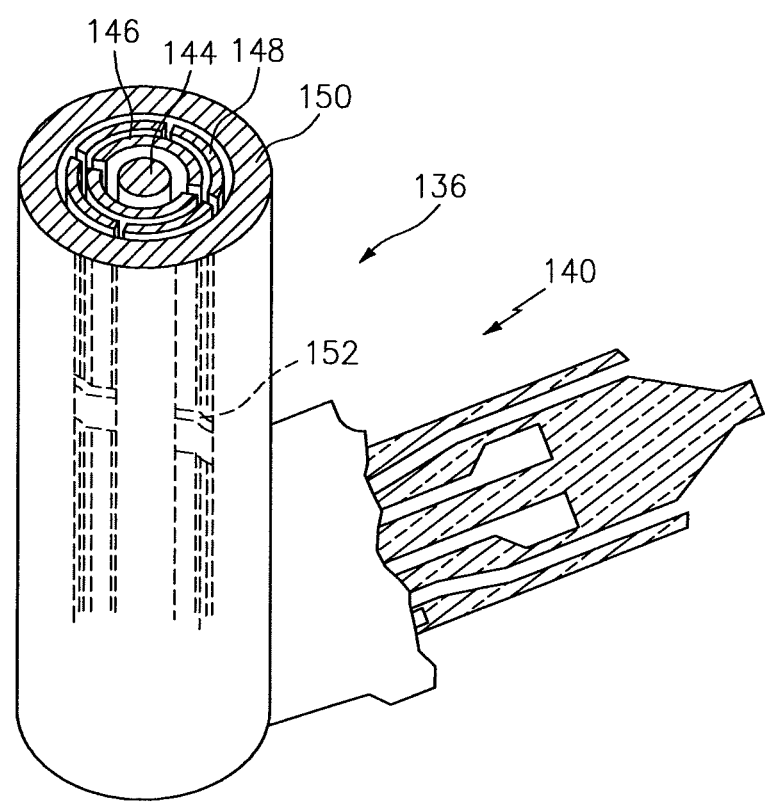
FIG. 6 is a perspective sectional view of a sacrificial core for the fuel nozzle according to one disclosed non-limiting embodiment.

With reference to FIG. 6, a sacrificial core 140 defines the internal geometry 136 of a fuel component body 142 (see FIGS. 4 and 5). That is, the fuel component body 142 generally includes the first inlet 100, the second inlet 102, the support 104, the mount flange 106 and the nozzle tip 108 with the internal geometry 136 thereof formed by the sacrificial core 140. In this disclosed non-limiting embodiment, the fuel component body 142 is generally rectilinear or circular in cross-section, however other cross-sections will also benefit herefrom and it should be appreciated that the example internal geometry 136 is illustrative only. Furthermore, although a fuel nozzle body is illustrated in the disclosed non-limiting embodiment of fuel component body 142, other components in communication with the combustion chamber 66 such as the swirler 90 and other fuel-air component with relatively complex internal geometry 136 will also benefit herefrom.

The sacrificial core 140 generally includes a first structure 144 that defines the first passage 120, a second structure 146 that defines the second passage 122, a third structure 148 that defines the inner volume 132 and a fourth structure 150 that defines the outer volume 134. The first structure 144 is generally surrounded by the second structure 146 that is generally surrounded by the third structure 148 which is generally surrounded by the fourth structure 150. That is, the structures 144, 146, 148, 150 are generally concentric but may include one or more connections 152 (illustrated somewhat schematically) therebetween to provide, in this disclosed non-limiting embodiment, a self-supporting sacrificial core 140. The various connections 152 are, for example, the negative of the transverse structure 138. That is, the sacrificial core 140 is the positive structure of the internal geometry 136 such that negatives of the sacrificial core 140 form structures within or between the passages 120, 122, the volumes 132, 134 such as connections 152, helical member 128, etc.

Figure 7:
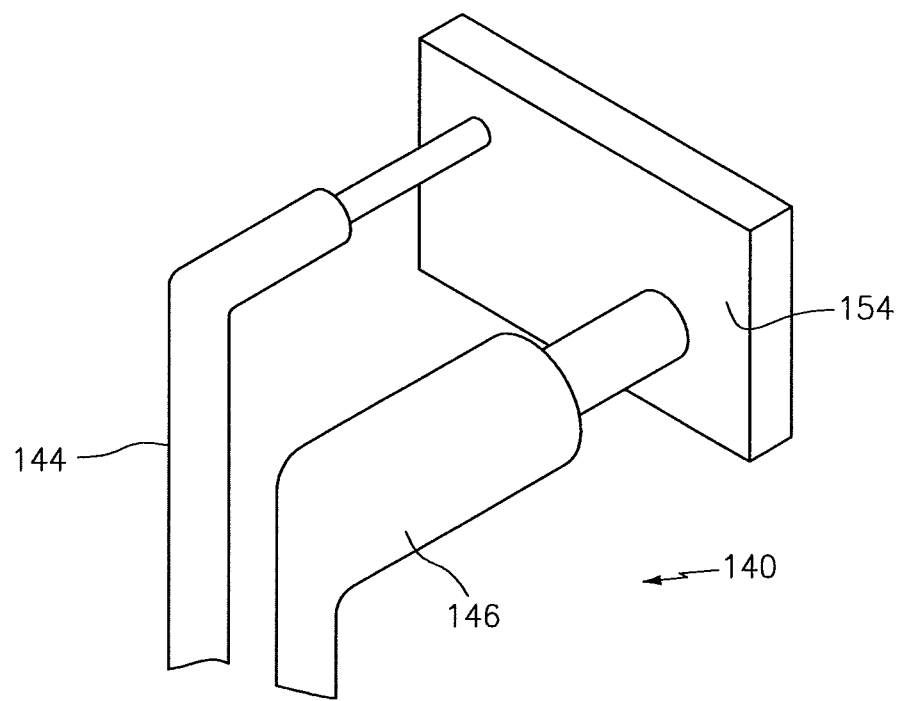
FIG. 7 is a perspective view of a sacrificial core for the fuel nozzle according to another disclosed non-limiting embodiment.

The additive manufactured sacrificial core 140 may alternatively or additionally include an interface structure 154 (see FIG. 7) that defines a connection between the first structure 144 and the second structure 146 formed outside of the respective inlets 100, 102. That is, the interface structure 154 essentially connects the passages 120, 122, and forms no part of the fuel component body 142 once manufactured. The interface structure 154 facilitates structural support of the sacrificial core 140 at locations between the structure 144, 146, i.e., passages 120, 122, which may not otherwise be connected, e.g., where no transverse structure 138 is provided therebetween. That is, the interface structure 154 may be utilized to provide a self-supporting additive manufactured sacrificial core 140. Alternatively, in another disclosed non-limiting embodiment, the interface structure 154 may be a shell that contains the sacrificial core 140. That is, the sacrificial core 140 is retained within the interface structure 154.

The sacrificial core 140 may be manufactured with a rapid manufacturing processes such as Direct Metal Laser Sintering (DMLS), Laser Net Shape Manufacturing (LNSM), Electron Beam Melting (EBM) and/or other additive manufacturing processes. The sacrificial core 140 facilitates manufacture of the relatively complex internal geometry 136 to minimize assembly details and multi-component construction.

Figure 8:
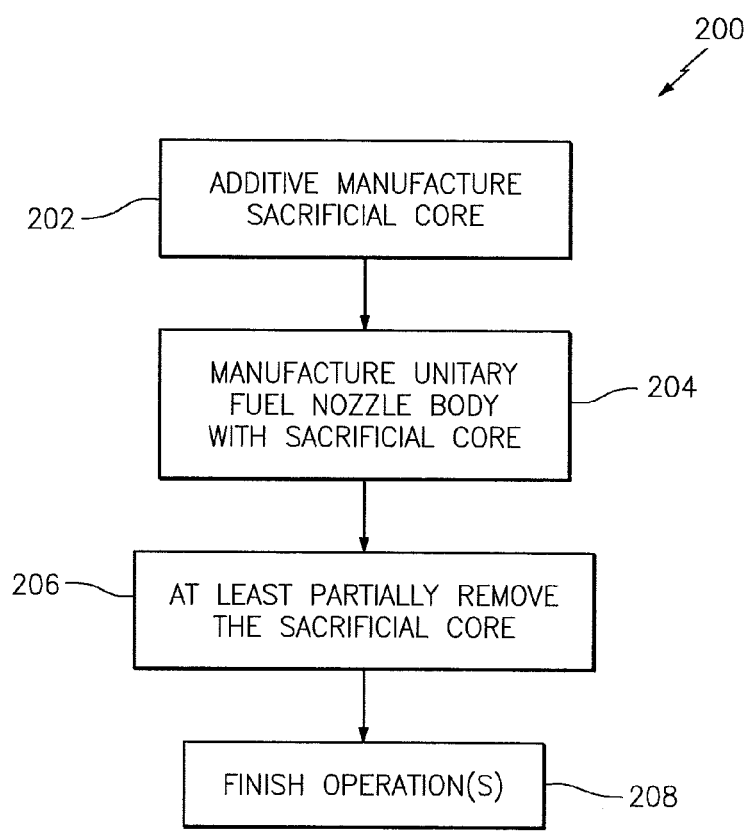
FIG. 8 is a flow chart showing an exemplary embodiment of a method for fabricating a fuel component body.

With reference to FIG. 8, a flow chart illustrates one disclosed non-limiting embodiment of a method 200 for fabricating the fuel component body 142. The method initially includes the additive manufacture of the sacrificial core 140 using, for example only, Direct Metal Laser Sintering (DMLS) (Step 202). DMLS is a manufacturing process that fabricates components using three-dimensional information, for example a three-dimensional computer model, of the sacrificial core 140. The three-dimensional information is converted into a plurality of slices, each slice defining a cross section of the component for a predetermined height of the slice. The additive manufactured sacrificial core 140 is then "grown" slice by slice, or layer by layer, until finished. Each layer has a size between about 0.0005-0.001 inches (0.0127-0.0254 mm).

In one disclosed non-limiting embodiment, the sacrificial core 140 is additive manufactured from a refractory metal alloy powder such as MO, NB, TA, W, or other suitable refractory metal or mixture thereof, and optionally, a protective coating. Example refractory metal alloys may include at least 50% or more by weight of one or more refractory metals. In another disclosed non-limiting embodiment, the sacrificial core 140 includes a ceramic core. In another disclosed non-limiting embodiment, the sacrificial core 140 may be a hybrid core, that is, hybrid of a ceramic and a refractory metal (alloy). The powder can have a particle size of between about 10 microns and 74 microns, preferably between about 15 microns and about 30 microns. Examples of suitable laser sintering machines are available from EOS North America, Inc. of Novi, Mich., USA.

Although the methods of manufacturing the sacrificial core 140 have been described herein using DMLS, those skilled in the art of manufacturing will recognize that any other suitable rapid manufacturing methods using layer-by-layer construction or additive fabrication can also be used. These alternative rapid manufacturing methods include, but not limited to, Selective Laser Sintering (SLS), 3D printing, such as by inkjets and laserjets, Sterolithography (SLS), Direct Selective Laser Sintering (DSLS), Electron Beam Sintering (EBS), Electron Beam Melting (EBM), Laser Engineered Net Shaping (LENS), Laser Net Shape Manufacturing (LNSM) and Direct Metal Deposition (DMD).

Next, the sacrificial core 140 is utilized to manufacture the fuel component body 142 (step 204). Example manufacture processes include, for example, die casting, such as horizontal, inclined or vertical die casting systems. That is, the sacrificial core 140 is utilized to form the internal geometry 136 of the fuel component body 142 which is itself formed by one or more other manufacturing processes such as die-casting. Another example manufacture process includes investment casting in which the sacrificial core 140 is, for example, designed to melt out of the pattern or remain part of the pattern and is removed after the workpiece is cast.

Following the die-casting, the fuel component body 142 is de-cored to remove the sacrificial core 140 (step 206) or partially remove the sacrificial core 140. Example decoring techniques include destructively removing the core by chemical leaching (e.g., alkaline and/or acid leaching). This step may be accomplished in different ways depending upon the material from which the sacrificial core 140 is manufactured. Once the sacrificial core 140 is removed, the fuel component body 142 is left with the internal geometry 136 which, in at least some locations may be completely self-contained.

The fuel component body 142 may then be subjected to finishing operations (step 208), to include but not be limited to, machining, threading, surface treating, coating or any other desirable finishing operation. Further, other separately manufactured components such as a nozzle insert and swirler may be assembled to the fuel component body 142 to form the finished fuel nozzle 86 via, for example a braze operation and/or removable assembly technique such as though a threaded interface. It should be appreciated that the fuel nozzle 86 could include more or less sections, parts and/or components thereof as well as other fuel components, to include but not be limited to the swirler 90.

A new sacrificial core 140 is used to manufacture each fuel component body 142 and forms no part of the finished fuel nozzle 86. The sacrificial core 140 provides an internal geometry 136 heretofore unavailable except with multiple assembled components.

It should be understood that relative positional terms such as "forward," "aft," "upper," "lower," "above," "below," and the like are with reference to the normal operational attitude of the vehicle and should not be considered otherwise limiting.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the features within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A method of manufacturing a fuel component for a gas turbine engine combustor, the method comprising:
    additive manufacturing a sacrificial core;
    manufacturing a fuel component body at least partially around the sacrificial core;
    at least partially removing the sacrificial core to at least partially define an internal geometry of the fuel component body of the fuel component;
    additive manufacturing a first structure and a second structure, the first structure at least partially defining a first passage of the internal geometry and the second structure at least partially defining a second passage of the internal geometry; and
    additive manufacturing an interface structure between the first structure and the second structure that is outside the internal geometry of the fuel component body during the manufacturing of the fuel component body.

2. The method as recited in claim 1, further comprising additive manufacturing the sacrificial core of a refractory metal alloy.

3. The method as recited in claim 1, further comprising additive manufacturing the sacrificial core of a ceramic material.

4. The method as recited in claim 1, further comprising additive manufacturing the sacrificial core of a hybrid material.

5. The method as recited in claim 1, further comprising additive manufacturing an interface structure that at least partially surrounds the sacrificial core.

6. The method as recited in claim 1, further comprising additive manufacturing an interface structure of the sacrificial core that is outside the internal geometry of the fuel component body during the manufacturing of the fuel component body.

7. The method as recited in claim 1, further comprising additive manufacturing a connection of the sacrificial core that is inside the internal geometry of the fuel component body during the manufacturing of the fuel component body.

8. The method as recited in claim 1, further comprising additive manufacturing a connection between the first structure and the second structure that is within the internal geometry of the fuel component body during the manufacturing of the fuel component body.

* * * * *